United States Patent
Chen et al.

(10) Patent No.: US 6,995,207 B2
(45) Date of Patent: Feb. 7, 2006

(54) REMOVABLE PRESSURE SENSITIVE ADHESIVES WITH PLASTICIZER RESISTANCE PROPERTIES

(76) Inventors: Augustin T. Chen, 893 Farmington Dr., Cheshire, CT (US) 06410; Hui Liu, 64 Old Sawmill Rd., Belchertown, MA (US) 01007; Leo Ternorutsky, 56 Schuyler Dr., East Longmeadow, MA (US) 01028

(*) Notice: Subject to any disclaimer, the term of this patent is extended or adjusted under 35 U.S.C. 154(b) by 21 days.

(21) Appl. No.: 10/403,487

(22) Filed: Mar. 31, 2003

(65) Prior Publication Data

US 2004/0192831 A1 Sep. 30, 2004

(51) Int. Cl.
*C08L 33/00* (2006.01)

(52) U.S. Cl. .................... 524/558; 524/523; 524/833; 526/320; 526/931; 428/500

(58) Field of Classification Search ................ 524/558, 524/523, 833, 745, 747, 831, 832; 526/320, 526/931; 428/500
See application file for complete search history.

(56) References Cited

U.S. PATENT DOCUMENTS

| | | |
|---|---|---|
| 4,814,514 A | 3/1989 | Yokota et al. |
| 5,286,843 A | 2/1994 | Wood |
| 5,332,854 A | 7/1994 | Yokota et al. |
| 5,496,603 A | 3/1996 | Riedel et al. |
| 5,620,796 A | 4/1997 | Kawabata et al. |
| 5,928,783 A | 7/1999 | Phan et al. |
| 6,013,722 A | 1/2000 | Yang et al. |
| 6,190,767 B1 | 2/2001 | Ishikawa et al. |
| 6,239,240 B1 | 5/2001 | Schultz et al. |
| 6,646,041 B2 * | 11/2003 | St. John Williams et al. ............ 524/522 |
| 2002/0037956 A1 * | 3/2002 | Avramidis et al. .......... 524/523 |

FOREIGN PATENT DOCUMENTS

| | | |
|---|---|---|
| EP | 0971010 A1 | 1/2000 |
| EP | 1273286 A2 | 1/2003 |
| JP | 2596441 B2 | 4/1989 |
| JP | 06-65551 A2 | 3/1994 |
| JP | 09-278837 A2 | 10/1997 |
| WO | WO 97/11996 A1 | 4/1997 |
| WO | WO 00/61670 A1 | 10/2000 |
| WO | WO 01/85867 A1 | 11/2001 |

* cited by examiner

*Primary Examiner*—Tatyana Zalukaeva
(74) *Attorney, Agent, or Firm*—Lathrop & Gage, L.C.

(57) ABSTRACT

A removable, plasticizer resistant pressure sensitive composition that is particularly useful for PSA applications on plasticizer containing vinyl films is provided. The pressure sensitive adhesive comprises: (a) at least one hydrophobic monomer; (b) about 0.2 to about 10 wt. % of at least one hydrophilic monomer; (c) about 1 to about 40 wt. % of one partially hydrophilic monomer (d) an effective amount of a crosslinker selected from diallyl maleate or a compound represented by the formula:

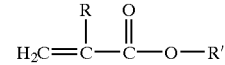

wherein R is selected from hydrogen, methyl, or ethyl, and R' is selected from vinyl, allyl, or methallyl; wherein the pressure sensitive adhesive does not contain a plasticizer.

37 Claims, No Drawings

REMOVABLE PRESSURE SENSITIVE ADHESIVES WITH PLASTICIZER RESISTANCE PROPERTIES

BACKGROUND OF THE INVENTION

This invention relates to removable pressure sensitive adhesives based on aqueous emulsions. The removable pressure sensitive adhesives of this invention have enhanced plasticizer resistance properties which are particularly useful for pressure sensitive adhesive applications on plasticizer containing vinyl films.

Removable pressure sensitive adhesives are used on a variety of products including labels, tapes, films, and the like, to enable the product to adhere to a substrate and then later to be removed from the substrate without difficulty and without leaving a stain or residue. To be suitable for such applications, the pressure sensitive adhesive must have good adhesion with low initial peel strength and must not exhibit a significant increase in adhesion over time. Optimally, the pressure sensitive adhesive should exhibit such physical properties on a variety of substrates. Typical commercially available aqueous emulsion removable pressure sensitive adhesives have anchorage and removability weakness when used with plasticizer containing facestocks such as vinyl films.

Plasticizers usually are moderately high molecular weight organic liquids, or occasionally low melting solids, which are incorporated in a material to increase its workability, flexibility, or distensibility. For example, polyvinyl chloride (PVC) or, as it is more commonly referred to, "vinyl", in its unmodified form, is typically rigid. When compounded with a plasticizer, it becomes more flexible and can be used for broader applications. Plasticized vinyl typically contains 15–50% by weight of either a monomeric or polymeric plasticizer, with the monomeric plasticizers being more commonly employed. The monomeric plasticizers are of relatively low molecular weight and tend to migrate to the surface of the plasticized vinyl. When a typical pressure sensitive adhesive is applied to a plasticized vinyl film and allowed to remain in contact with it for an extended period of time, plasticizer from the vinyl tends to migrate into the pressure sensitive adhesive, softening it and causing a decrease in adhesion. Pressure sensitive adhesives that have high initial peel strength are more resistant to plasticizer, however, the resulting decreased removability is undesirable.

Attempts have been made to solve the plasticizer migration problem by interposing an impenetrable barrier between the vinyl and the pressure sensitive adhesive ("PSA"); see, e.g., U.S. Pat. Nos. 4,045,600 and 4,605,592. Others have developed pressure sensitive adhesives that are said to be less susceptible to weakening by plasticizer, see U.S. Pat. No. 4,985,488. Another attempt to prevent migration of plasticizer from a plasticized vinyl substrate into a confronting pressure sensitive adhesive has been to incorporate plasticizer into the pressure sensitive adhesive, thereby minimizing the plasticizer gradient between the contacting layers; see, e.g., published European Pat. App. No. EP 150,978 A, and PCT publication no. WO 00/36043.

Despite the limited success achieved by products of the type discussed above, there has remained a strong commercial desire for pressure sensitive adhesives that not only maintain strong anchorage to a variety of vinyl films, but also maintain good removability.

SUMMARY OF THE INVENTION

According to this invention, a removable, plasticizer resistant pressure sensitive adhesive (PSA) is provided comprising a crosslinked aqueous emulsion polymer comprising: (a) at least one hydrophobic monomer selected from an alkyl (meth)acrylate ester of an alcohol wherein the alkyl portion of the alcohol is linear or branched and contains at least 4 carbon atoms; (b) about 0.2 to about 10 wt. % of at least one hydrophilic monomer; (c) about 1 to about 40 wt. % of one partially hydrophilic monomer selected from alkyl (meth)acrylate esters of an alcohol wherein the alkyl portion of the alcohol has 1 to 2 carbon atoms, N-vinyl-2-pyrrolidone, or mixtures thereof; and (d) an effective amount of crosslinker selected from diallyl maleate or compounds represented by the formula:

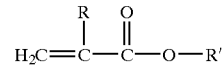

wherein R is selected from hydrogen, methyl, or ethyl, and R' is selected from vinyl (—HC=CH$_2$), allyl (—CH$_2$—CH=CH$_2$), or methallyl (—C(—CH$_2$)=CH$_2$); wherein the pressure sensitive adhesive does not contain a plasticizer.

As used herein, a PSA is "removable" and "plasticizer resistant" if, when the PSA is applied to a vinyl film facestock, the PSA has an initial peel value upon removal from a substrate of less than about 0.3 pounds per inch with the failure mode being essentially adhesive failure, and maintains a peel value (after aging for 7 days at 70° C.) of less than about 0.3 pounds per inch with essentially no transfer of adhesive to the substrate.

BRIEF DESCRIPTION OF THE DRAWINGS

Not Applicable.

DETAILED DESCRIPTION OF THE INVENTION

The invention provides aqueous emulsion PSA polymers that possess good plasticizer resistance properties and are removable. The product of this invention is particularly useful when used with plasticizer containing films such as window graphics applications, where low stable peel, non-ghosting and clean removability from glass and stainless steel are required. The pressure sensitive adhesives of the invention maintain strong anchorage to a variety of vinyl films, including films of polymers and co-polymers of vinyl chloride, and exhibit good plasticizer resistance and removability from the substrate.

The extent of removability can be determined by measuring the force (in pounds) needed to remove an adhesive/facestock film construction from a specific test surface using a 180° C. peel angle with a constant peel rate under conditions of constant temperature and humidity. PSAs with clean removability have low initial peel values of less than about 0.3 pound per inch with failure mode being essentially adhesive failure.

The removable, plasticizer resistant pressure sensitive adhesive compositions of this invention comprise a crosslinked aqueous emulsion polymer comprising: (a) at least one hydrophobic monomer selected from an alkyl (meth)acrylate ester of an alcohol wherein the alkyl portion of the alcohol is linear or branched and contains at least 4 carbon atoms; (b) about 0.2 to about 10 wt. % of at least one hydrophilic monomer; (c) about 1 to about 40 wt. % of one partially hydrophilic monomer selected from alkyl (meth) acrylate esters of an alcohol wherein the alkyl portion of the alcohol has 1 to 2 carbon atoms, N-vinyl-2-pyrrolidone, or mixtures thereof; and (d) an effective amount of a crosslinker selected from diallyl maleate or compounds represented by the formula:

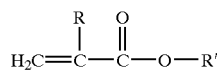

wherein R is selected from hydrogen, methyl, or ethyl, and R' is selected from vinyl (—HC═CH$_2$), allyl (—CH$_2$—CH═CH$_2$), or methallyl (—C(—CH$_2$)═CH$_2$); provided that the pressure sensitive adhesive does not contain a plasticizer. As used herein, the phrase "pressure sensitive adhesive does not contain a plasticizer" means that the PSA, both as polymerized and as formulated for application to a vinyl film facestock, does not contain a plasticizer. Once applied to a vinyl facestock, the PSAs of the invention will allow the migration of a finite amount of plasticizer from the vinyl film into the PSA.

The hydrophobic monomer that can be employed according to this invention include at least one alkyl (meth)acrylate ester of an alcohol wherein the alkyl portion of the alcohol is linear or branched and contains at least 4 carbon atoms. As used herein, the term alkyl (meth)acrylate includes both alkyl acrylates and alkyl methacrylates. The alkyl groups of the alkyl acrylate or alkyl methacrylate monomers are preferably linear or branched alkyl radicals having from 4 to about 14 carbon atoms, more preferably from 4 to about 10 carbon atoms, and most preferably from 4 to about 8 carbon atoms. Examples of suitable alkyl acrylates and alkyl methacrylates include isooctyl acrylate, 4-methyl-2-pentyl acrylate, 2-methyl-butyl acrylate, isoamyl acrylate, sec-butyl acrylate, n-butyl acrylate, 2-ethylhexyl acrylate, isodecyl methacrylate, isononyl acrylate, isodecyl acrylate, and the like, singly or in mixtures of two or more. The currently preferred alkyl acrylate or alkyl methacrylate ester monomers are 2-ethylhexyl acrylate, n-butyl acrylate, and mixtures thereof.

The amount of hydrophobic monomers, based on the total weight of monomers (a), (b), (c) and (d), is from about 50 to about 90 wt. %, preferably about 60 to about 84 wt. %, and more preferably from about 70 to 80 wt. %.

Hydrophilic monomers that can be employed according to this invention are monomers that are copolymerizable with the hydrophobic monomer and that are water soluble. The hydrophilic monomers are selected from monoolefinic monocarboxylic acids, monoolefinic dicarboxylic acids, 2-hydroxyethyl acrylate, or mixtures thereof.

Examples of suitable hydrophilic monomers include, but are not limited to, acrylic acid, methacrylic acid, fumaric acid, maleic acid, itaconic acid, crotonic acid, oligomeric acrylic acid, 2-hydroxyethyl acrylate, and mixtures thereof. The currently preferred hydrophilic monomers are acrylic acid, 2-hydroxyethyl acrylate, methacrylic acid, and mixtures thereof.

The amount of hydrophilic monomers, based on the total weight of monomers (a), (b), (c) and (d), is from about 0.2 to about 10 wt. %, preferably about 0.2 to 5 wt. %, and more preferably about 1 to 3 wt. %.

Partially hydrophilic monomers that can be employed according to the invention include alkyl (meth)acrylate esters of an alcohol wherein the alkyl portion of the alcohol has 1 to 2 carbon atoms, N-vinyl-2-pyrrolidone, or mixtures thereof. The partially hydrophilic monomers can also be referred to as partially water soluble monomers.

Examples of suitable partially hydrophilic monomers include methyl acrylate, methyl methacrylate, ethyl acrylate, N-vinyl-2-pyrrolidone, and mixtures thereof. The currently preferred partially hydrophilic monomers are ethyl acrylate, ethyl methacrylate, and mixtures thereof, with ethyl acrylate being currently most preferred.

The amount of partially hydrophilic monomers, based on the total weight of monomers (a), (b), (c) and (d), is from about 1 to about 40 wt. %, preferably from about 10 to about 25 wt. %, and more preferably from about 12 to about 25 wt %.

An effective amount of the crosslinkers of the invention is used for the preparation of the removable, plasticizer resistant PSAs of the invention. In addition to the composition of monomers (a), (b) and (c) of the invention, the addition of an effective amount of the crosslinker of the invention is another critical feature of the invention. The aqueous emulsion polymer of the invention is sufficiently crosslinked such that the resulting crosslinked PSA network is sufficiently loose to allow enough plasticizer penetration to prevent plasticizer build-up at the PSA-vinyl film interface, and yet tight enough to limit the mobility of the aqueous emulsion polymer chains and prevent peel strength build-up. Consequently, the pressure sensitive adhesives of the instant invention achieve both good anchorage and clean removability from the substrates to which the PSAs are applied.

The crosslinkers that can be employed by this invention include diallyl maleate, and compounds represented by the formula:

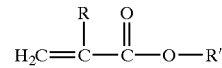

wherein R is selected from hydrogen, methyl or ethyl, and R' is selected from vinyl (—HC═CH$_2$), allyl (—CH$_2$—CH═CH$_2$), or methallyl (—C(—CH$_2$)═CH$_2$).

Examples of suitable crosslinkers include allyl acrylate, allyl methacrylate, vinyl acrylate, vinyl methacrylate, methallyl acrylate, methallyl methacrylate or mixtures thereof.

The amount of the crosslinker, based on the total weight of monomers (a), (b), (c) and (d), is about 0.2 wt. % to about 1.0 wt. %, and preferably from about 0.3 to 0.6 wt. %.

The aqueous PSA compositions of this invention, both as polymerized and as formulated, do not contain plasticizers. Plasticizers tend to destroy adhesion to vinyl film and cause transfer failure, or migrate onto the substrate to which PSAs are applied and leave a residue of plasticizer on the substrate when the PSA is removed. It is also preferred not to include waxes in the PSA compositions of the invention.

The process for the preparation of the removable, plasticizer resistant pressure sensitive adhesives of the invention utilizes at least one water-soluble polymerization initiator. Any conventional water-soluble polymerization initiator that is normally acceptable for emulsion polymerization of acrylate monomers may be used and such polymerization initiators are well known in the art. The typical concentration of water-soluble polymerization initiators is about 0.01 wt. % to about 1 wt. %, preferably about 0.01 wt. % to about 0.5 wt. %, of the total weight of monomers (a), (b), (c), and (d) charged in the pre-emulsion. The water soluble polymerization initiators can be used alone or used in combination with one or more conventional reducing agents, such as bisulfites, metabisulfites, ascorbic acid, sodium formaldehyde sulfoxylate, ferrous sulfate, ferrous ammonium sulfate, ferric ethylenediamine-tetraacetic acid, and the like. Water-soluble polymerization initiators that can be employed according to the invention include water soluble persulfates, peroxides, azo compounds and the like, and mixtures thereof. Examples of water soluble initiators include, but are not limited to, persulfates (e.g. potassium persulfate, and sodium persulfate), peroxides (e.g. hydrogen peroxide, and tert-butyl hydroperoxide), and azo compounds (e.g. 4,4'-azobis(4-cyano-pentanoic acid), V-501 from Wako Chemicals). Currently the preferred water soluble polymerization initiators are the persulfates, particularly potassium persulfate.

The polymerization can be initiated by any conventional method known to those skilled in the art, such as by application of heat or radiation. The method of initiation will be dependent on the water-soluble polymerization initiator used and will be readily apparent to those skilled in the art.

The water soluble polymerization initiator can be added to the polymerization reaction in any conventional manner known in the art. It is currently preferred to add the initiator to the initial polymerization reactor charge which comprises water. Alternatively, an initial amount of the polymerization initiator can be added to the initial reactor charge and the remainder of the initiator added continuously or incrementally during the emulsion polymerization.

At least one surfactant is utilized in the polymerization and it is currently preferred to add the surfactant with water and the monomers to from a pre-emulsion. The pre-emulsion is then charged to the polymerization reactor and the polymerization conducted.

The surfactants that can be employed include anionic, nonionic, cationic, or amphoteric emulsifiers and mixtures thereof. Ionic emulsifiers are currently preferred, with anionic emulsifiers being currently most preferred. Examples of suitable anionic emulsifiers include, but are not limited to, alkyl aryl sulfonates (e.g. sodium dodecylbenzene sulfonate), alkyl sulfates (e.g. sodium dodecyl sulfate, ammonium dodecyl sulfate), sulfates of ethoxylated alcohols (e.g. sodium lauryl ether sulfate), sulfates and sulfonates of ethoxylated alkylphenols (e.g. ammonium nonylphenol ether (EO=30) sulfate, sodium salt of alkylaryl polyether sulfonates), sulfosuccinates (e.g. sodium dioctyl sulfosuccinate), diphenyl sulfonates (e.g. sodium dodecyl diphenyloxide disulfonate), and mixtures thereof. Examples of suitable nonionic emulsifiers include, but are not limited to, ethoxylated alcohols (e.g. ethoxylated oleyl alcohol), ethoxylated alkylphenols (e.g. nonylphenol ethoxylate), and mixtures thereof. Examples of suitable cationic emulsifiers include, but are not limited to, ethoxylated fatty amines (e.g. ethoxylated tallow amine).

The typical concentration of surfactant is based on the total weight of monomers (a), (b), (c) and (d), and is about 0.1 to about 5 wt. %, preferably about 0.5 to about 3 wt. %.

The polymerization reaction can be conducted in any conventional reaction vessel capable of an emulsion polymerization. It can be conducted at a temperature typical for emulsion polymerizations, preferably at a temperature in the range of about 50° C. to about 95° C., most preferably in the range of about 55° C. to about 85° C.

The polymerization time is that time needed to achieve the desired conversion based on the other reaction conditions, e.g. temperature profile, and reaction components, e.g. monomers, initiator, etc. The polymerization time will be readily apparent to those skilled in the art.

Following polymerization, if the pH of the latex emulsion is not within the desired pH range of about 6 to about 9, and more preferably about 6 to about 8, the pH of the emulsion is adjusted by contacting the latex emulsion with a suitable base in an amount necessary to raise the pH to the desired pH. Examples of suitable bases for adjusting the pH of the latex emulsion include alkali metal hydroxides, alkaline earth metal hydroxides, ammonium hydroxide, amines, and the like, and mixtures thereof.

The latex emulsion typically has a solids content of from about 40 to about 70 wt. %, and preferably about 55 to about 65 wt. %.

EXAMPLES

| Material: | Abbreviation/Material Information |
|---|---|
| Ethyl Acrylate | EA; CAS [140-88-5] Dow, Celanese, BASF |
| Butyl Acrylate | BA; CAS [141-32-2] Dow, Celanese, BASF |
| Acrylic Acid (glacial) | AA; CAS [79-10-7] Celanese, BASF |
| Allyl Methacrylate | ALMA; CAS [96-05-9] AGEFLEX AMA, Mhoromer |
| Potassium Persulfate | PPS; CAS [7727-21-1] FMC Corp |
| Sodium Bicarbonate | $NaHCO_3$; CAS [144-55-8] Church & Dwight |
| Aerosol NPES 30/30 | Ammonium salt of poly(oxy-1,2-ethanediyl)-α-sulfo-ω(nonylphenoxy); CAS [9051-5-4] Cytec |
| Aerosol OT (75% active) | Sodium dioctylsulfosuccinate; CAS [2673-22-5] Cytec |
| Triton X-305 (70% active) | Octyl phenoxypolyethoxyethanol; CAS [9036-19-5] Dow |
| Trigonox AW-70 | CAS [75-91-2] Akzo Nobel |
| Parolite | Zinc formaldehyde sulfoxylate; CAS [24887-06-7] Cognis Corp |
| NoFoam 1976 | Defoamer; mixture of surfactants; Oil Chem Technologies |
| Kathon LX Biocide | CAS [26172-55-4], [2682-20-4] Rohm & Haas |
| Diallyl Maleate | DAM; CAS [999-21-3] ALDRICH |

Peel Testing Procedure:

PSA 180° C. Angle Dynamic Peel test was conducted to determine the force (in pounds) needed to remove an adhesive/carrier film construction from a specific test surface using a 180° C. peel angle with a constant peel rate under conditions of constant temperature and humidity. Wet adhesive was coated on release liner at certain coat weight. The wet adhesive was air dried for 15 min before being placed in an oven (90° C.) for 5 min. drying. The adhesive was then transferred to a vinyl film facestock. A sample test strip of 1"×5" was applied to a substrate, and 1 lb pressure was applied. The test strip(s) were subjected to the specified test conditions of time, temperature and humidity. [Note: Tests were at least run in duplicate.] Peel strength was determined in an Instron Test Machine (Model No. 1125) by peeling a strip from the substrate at an 180° C. angle.

In reporting results, the mode of the peel failure is identified as follows: "a" meaning adhesive failure, i.e. adhesive entirely separates from the substrate, "c" meaning cohesive failure, i.e. the adhesive is left partially on the substrate and partially on the facestock, "t" meaning transfer failure, i.e. the adhesive is all transferred to the substrate, and "g" meaning some type of material being deposited on the surface of the test substrate but can not be classified as polymeric in nature and does not exhibit any significant degree of tack. A peel failure mode of "a" is acceptable. A peel failure mode of "c" or "t" is unacceptable as adhesive is left on the substrate. Abbreviations for peel testing conditions are identified as follows:

PL(24 hr): Peel strength at 24 hours; PL(1 wCTH): Peel strength after 1 week under constant temperature and humidity; PL(3 d 70° C.): Peel strength after 3 days at 70° C.;

PL(1 w 70° C.): Peel strength after 1 week at 70° C.; PL(1 w Hum): Peel strength after 1 week under constant humidity; PL(20 min): Peel strength at 20 min.; PL(20 hr): Peel strength at 20 hours; PL(4 d@65° C.): Peel strength after 4 days at 65° C.; and PL(4 d 70° C.): Peel strength after 4 days at 70° C.

Example 1

Materials are charged as the following. Pilot plant and lab have the same recipe, only different scale. All data, charge, and scales were taken from lab conditions.]

The following table is lab scale charge.

| Material | Reactor Charge | Pre-emulsion Surfactant Charge | Pre-emulsion Monomer Charge | First Post-add | Second Post-add | Total |
|---|---|---|---|---|---|---|
| Water | 262.2 | 141.1 | | 5.05 | | 408.4 |
| Sodium Bicarbonate | 2.00 | | | | | 2.00 |
| Potassium Persulfate | 3.36 | | | | | 3.36 |
| Aerosol NPSE 30/30 | | 16.13 | | | | 16.13 |
| Triton X-305 (70%) | | 1.5 | | | | 1.5 |
| Aerosol OT 75% | | 5.84 | | | | 5.84 |
| Acrylic Acid | | | 12.09 | | | 12.09 |
| Ethyl Acrylate | | | 97.05 | | | 97.05 |
| ALMA | | | 3.31 | | | 3.31 |
| Butyl Acrylate | | | 448.3 | | | 448.3 |
| Trigonox A-W70 (70%) | | | | 0.50 | | 0.50 |
| Parolite | | | | 0.41 | | 0.41 |
| Nofoam 1976 | | | | 1.16 | | 1.16 |
| Kathon LX | | | | | 0.12 | 0.12 |
| Total | 267.6 | 164.6 | 560.7 | 7.12 | 0.12 | 1000 |

Polymerization Procedure:

Water and initiator PPS were charged in the polymerization kettle (2 liter reactor) and agitation began. Aerosol NPSE, Triton X-305, and Aerosol OT were premixed in a pail with water and the mixture was then added to a delay tank. The mixture was agitated in the delay tank till the surfactants are uniformly miscible with water. Under agitation, the preemulsion monomers were charged to the delay tank in the following order of addition: acrylic acid, ethyl acrylate, allyl methacrylate, butyl acrylate. Monomers and surfactants were mixed together at the delay tank to form a white milky preemulsion. The reactor contents were heated to 55° C. The jacket of the reactor was heated until the reactor mixture reaches 77+/−1° C. and then the preemulsion was fed into kettle over a period of 195 minutes. During the polymerization, the reactor temperature was maintained at 82.5+/−0.5° C. At the end of the preemulsion delay charge, the reactor was held at 82° C. for 30 min. The reactor contents were then cooled to 55° C., Trigonox and Parolite were added to the reactor, and the reactor contents held for 30 min. After the post-cure period, the reactro contents were cooled to 35+/−1° C., then Nofoam 1976 defoamer and Kathon LX biocide were added to the reactor.

The aqueous PSA polymers made according to the invention (Sample #1 and Sample #2) appear to be white viscous emulsion containing no foreign material such as insolubles, or coagulum. The total solid is from about 56% to about 60 wt. %. Peel strength of the polymer products are shown below in Table 1.

The PSAs were formulated before testing. The following table is the PSA formulation recipe.

| Material | Amount | Mix time (min) |
|---|---|---|
| GME-3210 | 100 | |
| AMP-95 | 0.7 | 30 |
| Aerosol OT | 1.0 | 45 |
| Tacolyn 1070 | 30 | 60 |
| Acusol 830 | 0.1~0.4 | 60 |

TABLE 1

Peel Testing Results

| | | Sample #1 | | Sample #2 | |
|---|---|---|---|---|---|
| | Facestock: | INTEX | | INTEX | |
| | Coatweight: | 0.68" | GF | 0.72" | GF |
| SS | PL 24 hr | 0.28a | 0.18a | 0.175a | 0.14a |
| GL | PL 24 hr | 0.16a | 0.12a | 0.2a | 0.1a |
| SS | PL (1w CTH) | 0.25a | 0.19a | 0.3a | 0.22a |
| GL | PL (1w CTH) | 0.245a | 0.12a | 0.28a | 0.17a |
| SS | PL (3d 70° C.) | 0.05a | 0.04a | 0.03a | 0.025a |
| GL | PL (3d 70° C.) | 0.04a | 0.02a | 0.02a | 0.02a |
| SS | PL (1w 70° C.) | 0.05a | 0.05a | 0.05a | 0.04a |
| GL | PL (1w 70° C.) | 0.06a | 0.05a | 0.045a | 0.03a |
| SS | PL (1w Hum) | 0.17a/g | 1.05c | 0.015a | 0.01a |
| GL | PL (1w Hum) | 0.18a/g | 0.2a/g | 0.025a/g | 0.015a/g |

Abbreviations:
SS: Stainless steel as substrate test plate
GL: Glass as substrate test plate
INTEX: PVC vinyl film INTEX Plastics Corporation
GF: PVC vinyl film from General Formulations (GF/VPI, Geon, Renolit, HPG)

The results demonstrate that the crosslinked PSAs of the invention are removable and plasticizer resistant (acceptable peel strength and adhesive failure mode).

Example 2 (Comparison)

The polymers of Example 2 was polymerized according to the procedure described in Example 1 except that 0.4 wt. % (2.4 g) of butenediol diacrylate was used as crosslinker. The polymerization procedure and amount of reactants were the same. Both crosslinkers were used in the same mol amount as the ALMA, which is 0.026 mol in polymer correspondingly (Diallylmaleate: 5.48 g, Allylacrylamide 2.89 g).

Three formulations, HL2A, HL2B, and HL2C, are produced with different levels of tackifier (Tacolyn 1070). Peel strength of the polymer products are provided in Table 2.

TABLE 2

Peel Strength - Butenediol Diacrylate Crosslinker

| Sample | Tackifier | substrate | PL (20 min) | PL (24 hrs) | PL (4 d @ 65° C.) |
|---|---|---|---|---|---|
| HL2A | 0 | SS | 1.25a | 1.77a | 1.72t |
| | 0 | Glass | 1.16a | 1.22a | 1.5t |
| HL2B | 5% | SS | 1.72a | 2.28a | 1.7t |
| | 5% | Glass | 1.5a | 1.89a | 1.35a |
| HL2C | 15% | SS | 2.06a | 2.67a | 1.73 70% t |
| | 15% | Glass | 1.65a | 2.28a | 1.35a |

The results demonstrate that the crosslinked PSAs using butenediol diacrylate as crosslinker are not removable (Peel Strength>0.3 pound/inch).

Example 3 (Comparison)

The polymers of Example 3 were prepared according to the same procedure as described in Example 2, except 0.08 wt. % of hexenediol diacrylate (0.48 g) was used as the crosslinker. Four formulations (HL3A-D) were made at different tackifier levels (Tacolyn 1070) from the same base polymer, HL3U. Peel strength of the polymer products using the 180° C. dynamic peel testing is provided in Table 3.

TABLE 3

Peel Strength - Hexenediol Diacrylate Crosslinker

| Sample | Tackifier | substrate | PL (20 min) | PL (24 hrs) | PL (4 day @ 65° C.) |
|---|---|---|---|---|---|
| HL3A | 10% | SS | 3.85a | 5.1a | 5.8a |
|  | 10% | Glass | 4.37a | 4.61a | 6.13a |
| HL3B | 20% | SS | 3.98a | 5.17a | 5.91a |
|  | 20% | Glass | 4.61a | 5.02a | 6.36a |
| HL3C | 30% | SS | 4.24a | 5.54a | 6.22a |
|  | 30% | Glass | 4.58a | 4.47a | 6.67a |
| HL3D | 40% | SS | 4.54a | 4.91a | 6.87a |
|  | 40% | Glass | 5.04a | 4.6a | 6.12a |

The results demonstrate that the crosslinked PSAs using hexenediol diacrylate as crosslinker are not removable.

Example 4 (Comparison)

The polymers of Example 4 were polymerized according, to the same procedures as disclosed in Example 3, except the amount of hexenediol diacrylate crosslinker is 0.2 wt. % (HL4A) (1.2 g) and 0.4 wt. % (HL4B) (2.4 g), respectively. Both crosslinked PSAs using hexenediol diacrylate as crosslinker showed unacceptably high peel strengths with adhesive failure mode similar to the results of the HL3 series in Example 3.

Example 5 (Comparison)

The polymers of Example 5 were polymerized according to the procedure described in Example 1 except that allyl glycidyl ether (0.6 g AGE for 0.1%, 1.4 g AGE for 0.25%, and 2.7 g AGE for 0.5%) was used as crosslinker. Sample LT5A, LT5B and LT5C are samples with different amount of crosslinker. The peel strength of the crosslinked PSA products using the 180° C. dynamic peel testing is provided in Table 4.

TABLE 4

Peel Strength of Polymers

| SAMPLE | AGE % | SUBSTRATE | PL (20 hr) | PL (24 hr) | PL (70° C./4 days) |
|---|---|---|---|---|---|
| LT5A | 0.1 | SS | 2.0c | 3.2c | 4.1t |
|  | 0.1 | Glass | 1.5a/c | 2.1a/c | 3.2t |
| LT5B | 0.25 | SS | 0.9a/t | 2.4c/t | 3.8c/t |
|  | 0.25 | Glass | 0.8a/t | 2.2c/t | 3.0c/t |
| LT5C | 0.5 | SS | 0.7a/t | 1.8c/t | 3.4c/t |
|  | 0.5 | Glass | 0.6a | 1.2c/t | 2.7c/t |

*Facestock: PVC film

Results demonstrate the crosslinked PSA using allyl glycidyl ether are not removable with high peel strength and unacceptable failure mode.

Example 6

The polymers of Example 6 were polymerized according to the procedure described in Example 1 except that the PSAs are crosslinked with ALMA (HL6A, invention), diallyl maleate (HL6B, invention) and allyl acrylamide (HL6C, comparison). (2.89 g of crosslinker was used). ALMA crosslinker is used at the level 0.0046 mol/100 g; wt. % is 0.059%.

TABLE 5

Peel Strength of Polymers

| | Peel test conditions | PVC film INTEX | | | PVC film GF | | |
|---|---|---|---|---|---|---|---|
| Substrate | sample coatweight | HL6A 0.72 | HL6B 0.67 | HL6C 0.65 | HL6A 0.72 | HL6B 0.67 | HL6C 0.65 |
| SS | PL (24hr) | 0.06a | 0.13a | 1.8a | 0.05a | 0.025a | 1.81a |
| GL |  | 0.06a | 0.06a | 1.62a | 0.05a | 0.05a | 0.58a |
| SS | PL (1 week CTH) | 0.12a | 0.2a | 1.58a | 0.18a | 0.19a | 1.79a |
| GL |  | 0.145a | 0.14a | 1.75a | 0.13a | 0.07a | 1.39a |
| SS | PL (1 week 70° C.) | 0.08 15% t 0.08a | 0.03a/g | 0.16t | 0.09a | 0.02a/g | 0.085a/g |
| GL |  | 0.08 15% t 0.06a | 0.02a/g | 0.135a/g 40% t | 0.06a | 0.025a/g | 0.09a/g |

The experimental results demonstrate that crosslinked PSA polymers prepared using diallyl maleate and allyl methacrylate as crosslinkers are removable from test plate (substrate). PSA samples prepared using allyl acrylamide as crosslinker show unacceptably high peel strength and/or unacceptable adhesive failure mode.

What is claimed is:

1. A removable, plasticizer resistant pressure sensitive adhesive composition comprising a crosslinked aqueous emulsion polymer comprising:
   (a) at least one hydrophobic monomer selected from an alkyl (meth)acrylate ester of an alcohol wherein the alkyl portion of the alcohol is linear or branched and contains at least 4 carbon atoms;
   (b) about 0.2 to about 10 wt. % of at least one hydrophilic monomer; and
   (c) about 1 to about 40 wt. % of one partially hydrophilic monomer selected from the group consisting of an alkyl (meth)acrylate esters of an alcohol wherein the alkyl portion of the alcohol has 1 to 2 carbon atoms, N-vinyl-2-pyrrolidone, and mixtures thereof; and (d) an effective amount of a crosslinker selected from the group consisting of diallyl maleate and compounds represented by the formula;

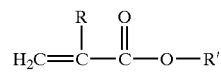

wherein R is selected from the group consisting of hydrogen, methyl, and ethyl, and R' is selected from the group consisting of vinyl (—HC=CH$_2$), allyl (—CH$_2$—CH=CH$_2$), and methallyl (—C(—CH$_2$)=CH$_2$);

wherein said pressure sensitive adhesive does not contain a plasticizer, and wherein said removable, plasticizer resistant pressure sensitive adhesive has an initial peel strength of less than about 0.3 pounds per inch peel force, wherein said crosslinker is selected from the group consisting of allyl acrylate and allyl methacrylate.

2. The composition of claim 1 wherein the amount of monomer (a) in said crosslinked aqueous emulsion polymer is about 50 to about 90 wt. %.

3. The composition of claim 1 wherein the amount of monomer (a) in said crosslinked aqueous emulsion polymer is about 60 to about 84 wt. %.

4. The composition of claim 3 wherein the amount of monomer (a) in said crosslinked aqueous emulsion polymer is about 70 to about 80 wt. %.

5. The composition of claim 1 wherein the amount of monomer (b) in said crosslinked aqueous emulsion polymer is about 0.2 to about 5 wt. %.

6. The composition of claim 5 wherein the amount of monomer (b) in said crosslinked aqueous emulsion polymer is about 1 to about 3 wt. %.

7. The composition of claim 1 wherein the amount of monomer (c) in said crosslinked aqueous emulsion polymer is about 10 to about 25 wt. %.

8. The composition of claim 7 wherein the amount of monomer (c) in said crosslinked aqueous emulsion polymer is about 12 to about 25 wt. %.

9. The composition of claim 1 wherein said monomer (a) is selected from the group consisting of isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, isononyl acrylate, isodecyl acrylate, and mixtures thereof.

10. The composition of claim 9 wherein said monomer (a) is selected from the group consisting of 2-ethyl-hexyl acrylate, n-butyl acrylate, and mixtures thereof.

11. The composition of claim 1 wherein said monomer (b) is selected from the group consisting of a monoolefinic monocarboxylic acid, a monoolefinic dicarboxylic acid, 2-hydroxyethyl acrylate, and mixtures thereof.

12. The composition of claim 11 wherein said monomer (b) is selected from the group consisting of acrylic acid, methacrylic acid, fumaric acid, maleic acid, itaconic acid, crotonic acid, oligomeric acrylic acid, 2-hydroxyethyl acrylate, and mixtures thereof.

13. The composition of claim 12 wherein said monomer (b) is selected from the group consisting of acrylic acid, 2-hydroxyethyl acrylate, methacrylic acid, and mixtures thereof.

14. The composition of claim 1 wherein said monomer (c) is selected from the group consisting of methyl acrylate, methyl methacrylate, ethyl acrylate, N-vinyl-2-pyrrolidone and mixtures thereof.

15. The composition of claim 14 wherein said monomer (c) is ethyl acrylate.

16. The composition of claim 1 wherein the amount of said crosslinker is from about 0.2 to about 1.0 wt. %.

17. The composition of claim 16 wherein the amount of said crosslinker is from about 0.3 to about 0.6 wt. %.

18. A removable, plasticizer resistant pressure sensitive adhesive composition comprising a crosslinked aqueous emulsion polymer comprising:

(a) at least one hydrophobic monomer selected from an alkyl (meth)acrylate ester of an alcohol wherein the alkyl portion of the alcohol is linear or branched and contains at least 4 carbon atoms;

(b) about 0.2 to about 10 wt. % of at least one hydrophilic monomer; and (c) about 1 to about 40 wt. % of one partially hydrophilic monomer selected from the group consisting of an alkyl (meth)acrylate esters of an alcohol wherein the alkyl portion of the alcohol has 1 to 2 carbon atoms, N-vinyl-2-pyrrolidone, and mixtures thereof; and (d) an effective amount of a crosslinker selected from the group consisting of diallyl maleate and compounds represented by the formula;

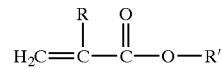

wherein R is selected from the group consisting of hydrogen, methyl, and ethyl, and R' is selected from the group consisting of vinyl (—HC=CH$_2$), allyl (—CH$_2$—CH=CH$_2$), and methallyl (—C(—CH$_2$)=CH$_2$);

wherein said pressure sensitive adhesive does not contain a plasticizer, and wherein said removable, plasticizer resistant pressure sensitive adhesive has an initial peel strength of less than about 0.3 pounds per inch peel force, wherein said crosslinker is diallyl maleate.

19. A label prepared from a removable, plasticizer resistant pressure sensitive adhesive of claim 1.

20. A tape prepared from a removable, plasticizer resistant pressure sensitive adhesive of claim 1.

21. A film prepared from a removable, plasticizer resistant pressure sensitive adhesive of claim 1.

22. The composition of claim 18 wherein the amount of monomer (a) in said crosslinked aqueous emulsion polymer is about 50 to about 90 wt. %.

23. The composition of claim 18 wherein the amount of monomer (a) in said crosslinked aqueous emulsion polymer is about 60 to about 84 wt. %.

24. The composition of claim 23 wherein the amount of monomer (a) in said crosslinked aqueous emulsion polymer is about 70 to about 80 wt. %.

25. The composition of claim 18 wherein the amount of monomer (b) in said crosslinked aqueous emulsion polymer is about 0.2 to about 5 wt. %.

26. The composition of claim 24 wherein the amount of monomer (b) in said crosslinked aqueous emulsion polymer is about 1 to about 3 wt. %.

27. The composition of claim 18 wherein the amount of monomer (c) in said crosslinked aqueous emulsion polymer is about 10 to about 25 wt %.

28. The composition of claim 26 wherein the amount of monomer (c) in said crosslinked aqueous emulsion polymer is about 12 to about 25 wt. %.

29. The composition of claim 18 wherein said monomer (a) is selected from the group consisting of isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, isononyl acrylate, isodecyl acrylate, and mixtures thereof.

30. The composition of claim 28 wherein said monomer (a) is selected from the group consisting of 2-ethyl-hexyl acrylate, n-butyl acrylate, and mixtures thereof.

31. The composition of claim 18 wherein said monomer (b) is selected from the group consisting of a monoolefinic monocarboxylic acid, a monoolefinic dicarboxylic acid, 2-hydroxyethyl acrylate, and mixtures thereof.

32. The composition of claim 30 wherein said monomer (b) is selected from the group consisting of acrylic acid, methacrylic acid, fumaric acid, maleic acid, itaconic acid, crotonic acid, oligomeric acrylic acid, 2-hydroxyethyl acrylate, and mixtures thereof.

33. The composition of claim 31 wherein said monomer (b) is selected from the group consisting of acrylic acid, 2-hydroxyethyl acrylate, methacrylic acid, and mixtures thereof.

34. The composition of claim 18 wherein said monomer (c) is selected from the group consisting of methyl acrylate, methyl methacrylate, ethyl acrylate, N-vinyl-2-pyrrolidone and mixtures thereof.

35. The composition of claim 33 wherein said monomer (c) is ethyl acrylate.

36. The composition of claim 18 wherein the amount of said crosslinker is from about 0.2 to about 1.0 wt. %.

37. The composition of claim 35 wherein the amount of said crosslinker is from about 0.3 to about 0.6 wt. %.

* * * * *